United States Patent [19]

Kimoto et al.

[11] Patent Number: 4,621,269

[45] Date of Patent: Nov. 4, 1986

[54] MAGNETIC RECORDING ARRANGEMENT FOR THERMOGRAPHIC PRINTING APPARATUS

[75] Inventors: Toshifumi Kimoto, Fujisawa; Teruhiko Itami, Atsugi; Akira Yamasawa, Ebina; Eiji Nishikawa, Atsugi; Nobuo Nishimura, Sagamihara, all of Japan

[73] Assignee: Fuji Xerox Co., Ltd., Tokyo, Japan

[21] Appl. No.: 665,301

[22] Filed: Oct. 26, 1984

[30] Foreign Application Priority Data

Feb. 15, 1984 [JP] Japan .................................. 59-26578
Feb. 15, 1984 [JP] Japan .................................. 59-26579

[51] Int. Cl.[4] ........................ G11B 9/00; G03G 15/02

[52] U.S. Cl. .................................. 346/74.4; 346/74.2; 346/74.3; 430/58

[58] Field of Search .................... 346/74.1, 74.2, 74.3, 346/74.4, 74.5, 74.6; 360/59; 430/34, 56, 57, 58, 60, 62, 63

[56] References Cited

U.S. PATENT DOCUMENTS 4,233,382 11/1980 Edwards et al. .............. 346/74.3 X
4,503,438 3/1985 Saitoh et al. ........................ 346/74.4
4,520,409 5/1985 Kimoto et al. ................. 346/74.5 X
4,531,137 7/1985 Drews et al. ....................... 346/74.4

*Primary Examiner*—E. A. Goldberg
*Assistant Examiner*—Linda M. Peco
*Attorney, Agent, or Firm*—A. Thomas S. Safford

[57] ABSTRACT

Magnetic recording arrangement, for example, in a thermomagnetographic plain-paper printer, produces a latent magnetic image on a magnetic recording medium which is composed of a ferromagnetic layer, first magnetized along a predetermined direction before forming the latent magnetic image, and a magnetic layer of high permeability to be converted into a paramagnetic layer by being subjected to the heat from a heating head until the layer is heated to its Curie point or above. The magnetic layers are respectively laminated to opposite sides of a base layer, the heating head being placed at the opposite side of the base layer from the ferromagnetic layer so as to remain out of contact with the ferromagnetic layer, thus making the cleaning of the heating head substantially unnecessary while keeping the latent magnetic image of high quality. In the magnetic recording medium, a direct-current magnetic field of the opposite sense as the magnetized direction of the ferromagnetic layer, or an alternating-current magnetic field the phase of which is reversed at positions corresponding to opposite ends of at least a paramagnetized part, is applied to the paramagnetized part of the high permeable magnetic layer thus forming a magnetic latent image on the ferromagnetic layer by leakage of the magnetic flux from the paramagnetized part to the ferromagnetic layer.

12 Claims, 11 Drawing Figures

MAGNETIC RECORDING ARRANGEMENT FOR THERMOGRAPHIC PRINTING APPARATUS

BACKGROUND OF THE INVENTION

1. Field of the Invention

The present invention relates to thermographic printers, such as photocopiers, telecopiers, and other plain-paper printers of the type employing a magnetic recording apparatus; the invention is more particularly directed to a magnetic recording apparatus by which images of high quality can be obtained and by which the adhesion of toner to a heating head can be completely avoided without complex construction of the apparatus.

2. Description of the Prior Art

Heretofore, magnetic recording apparatus such as shown, for example, in FIG. 1A has been proposed and which comprises a magnetic recording drum 1 onto which there is applied a thermomagnetic recording material, which varies in its magnetic characteristic properties dependent upon variation of temperature, a magnetizer 2 uniformly magnetizing the thermomagnetic recording material, a heating head array 3 for forming latent magnetic image, the array having finely separated heating resistance elements arranged in a row or a plurality of rows with the heating resistance elements being energized in response to a video signal to heat the thermomagnetic recording material to its Curie point or above so that the magnetized areas on the thermomagnetic recording material are selectively demagnetized, a developing means 4 for forming a visual image by adhering magnetic toner to the latent magnetic image formed by means of the heating head array 3 (including a built-in permanent magnet having the magnetizing direction opposite to that of the magnetizer 2 and smaller magnetizing force than that thereof), a transferring means 6 transferring the visual image formed by the development to a recording paper 5 fed from a paper feeding mechanism, the image being transferred by means of magnetizing force, a fixing means 7 for fixing the transferred image to the recording paper by either heating or pressurizing the recording paper 5 which has already been transferred, and a cleaner 8 for removing and cleaning the magnetic toner remaining on the surface of the magnetic recording drum 1 after completing the transferring step.

In the above case, a laser beam, a flash lamp, or the like, in place of the heating head array, may be utilized as heat applying means.

In this apparatus, a ferromagnetic material like $CrO_2$ may be used for the magnetic toner, and the toner is prepared by admixing the ferromagnetic material with a black coloring material consisting of carbon black and a resin powder such as polyester, polyethylene, or the like.

In the above construction, the magnetic recording drum 1 the surface of which is uniformly magnetized in a predetermined direction by means of the magnetizer 2 rotates at a constant rate to pass under the heating head array 3. Each heating resistance element of the heating head array 3 is energized on the basis of, for example, a video signal (which can be a binary signal) for one scanning line to partially demagnetize the magnetized layer of the thermomagnetic recording medium, and then the part thus demagnetized is magnetized in the opposite direction of the predetermined direction so that a latent magnetic image is formed. When the latent magnetic image thus formed reaches the position at which the developing means 4 is located, the magnetic tone is adhered by means of the developing means 4 so that a visible image is produced. Then the visible image moves to the transferring position while the recording paper 5 is conveyed to the transferring position from the paper feeding mechanism (not shown) in response to timing of the above movement, and the visible image is transferred to the recording paper 5 by means of the transferring means 6. The visible image so transferred is fixed onto the recording paper 5 by the use of the fixing means 7. The surface of the magnetic recording drum 1 after transferring the visible image is cleaned by the cleaner 8. In the magnetic recording apparatus described above, where only one piece of recording paper is recorded, uniform magnetization is carried out repeatedly by the magnetizer 2 to prepare the forming of a following latent magnetic image. However, in the case when the same image is to be printed onto a plurality of sheets of paper, the magnetizer 2 is immobilized and operation of the heating head array 3 is stopped, while plural repetitions of the developing and transferring operations are carried out with respect to the common latent magnetic image.

In the conventional magnetic recording apparatus, however, since the magnetic recording medium is partially heated in response to a video signal at a temperature at the Curie point or above to form a latent magnetic image, magnetic materials to be used are limited. In addition, there is a fear of deformation of the magnetic recording medium because high thermal energy is partially applied thereto. In the case where a laser is utilized as a means for applying heat, high power is required. Further, when a heating head array is utilized, there is the disadvantage that its magnetic recording drum is always in contact with the head array so that any magnetic toner remaining on the surface of the magnetic recording drum adheres to the heating resistance elements, and such tone is fused by the heat thereof to result in the deterioration of the quality of the picture image. For this reason, the head array has to be cleaned periodically.

In the forming of a developed image of a rather wide black colored part (i.e., a relatively wide area wholly covered with black toner), a latent magnetic image is formed over a wide area B on the magnetic recording drum 1 by magnetic fields of the opposite direction Y to the magnetizing direction X of the magnetizer 2 as shown in FIG. 1B. In such a case, since a strong magnetic attraction force is produced on the magnetic recording drum 1, a suitable amount of magnetic toner adheres to the magnetic drum 1. On the other hand, magnetic attraction force is weakened in the central part of the area B for the reason that the magnetic flux is parallel with the surface of the magnetic drum 1 so that less magnetic toner adheres to the magnetic drum 1. For this reason, a so-called "white loophole" phenomenon occurs in the central portion of the area B.

SUMMARY OF THE INVENTION

Accordingly, an object of the present invention is to provide a magnetic recording apparatus wherein there is prevented the fusing of magnetic toner to the heating head, whereby improvement in quality of the latent magnetic image is achieved.

Another object of the present invention is to provide a magnetic recording apparatus which does not require frequent cleaning of the heating head since fusion of magnetic toner to the heating head is prevented.

Still another object of the present invention is to provide magnetic recording apparatus which prevents occurrence of "white loophole" in a wider black colored part by driving its magnetic head from an AC power source.

More specifically, the present invention relates to magnetic recording apparatus comprising a magnetic recording medium composed of a first magnetic layer, formed of ferromagnetic material, on one side of a base layer and a second magnetic layer, formed of magnetic material of high permeability, on the other side of said base layer, first magnetic means magnetizing uniformly said first magnetic layer along a predetermined direction prior to forming a latent image, heating means positioned on the side of the second magnetic layer of said magnetic recording medium and heating said second magnetic layer in response to video signals to convert the part heated into a paramagnetic phase, and second magnetic means applying a magnetic field of the opposite direction to the magnetized direction of said first magnet to said second magnetic layer and forming a latent magnetic image on said first magnetic layer by means of magnetic flux leaking from the heated paramagnetic part.

Furthermore, the present invention relates to magnetic recording apparatus comprising a magnetic recording medium composed of a first magnetic layer formed with a ferromagnetic material on one side of a base layer and a second magnetic layer formed with a magnetic material of high permeability on the other side of said base layer, a first magnet magnetizing uniformly said first magnetic layer along a predetermined direction prior to forming latent image, a heating means positioned on the side of the second magnetic layer of said magnetic recording medium and heating said second magnetic layer in response to video signals to convert the part heated into paramagnetic material, and means for generating alternating magnetic field and applying the alternating magnetic field to said second magnetic layer to form a latent magnetic image on said first magnetic layer by means of alternating magnetic flux leaking from the heated, paramagnetic part.

DETAIL DETAILED DESCRIPTION OF THE PREFERRED EMBODIMENTS

Figure 1A:
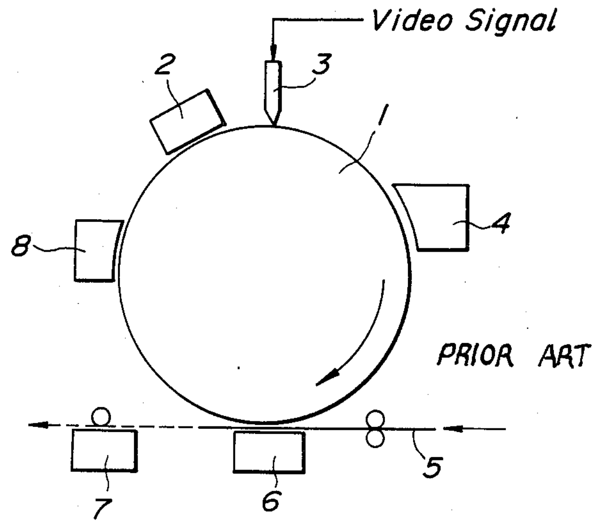
FIG. 1A is an explanatory view showing an example of conventional magnetic recording apparatus.
Figure 1B:
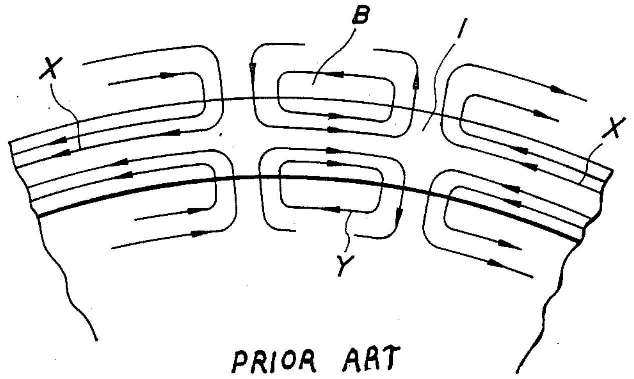
FIG. 1B is an explanatory view illustrating magnetic flux in a latent magnetic image.
Figure 2:
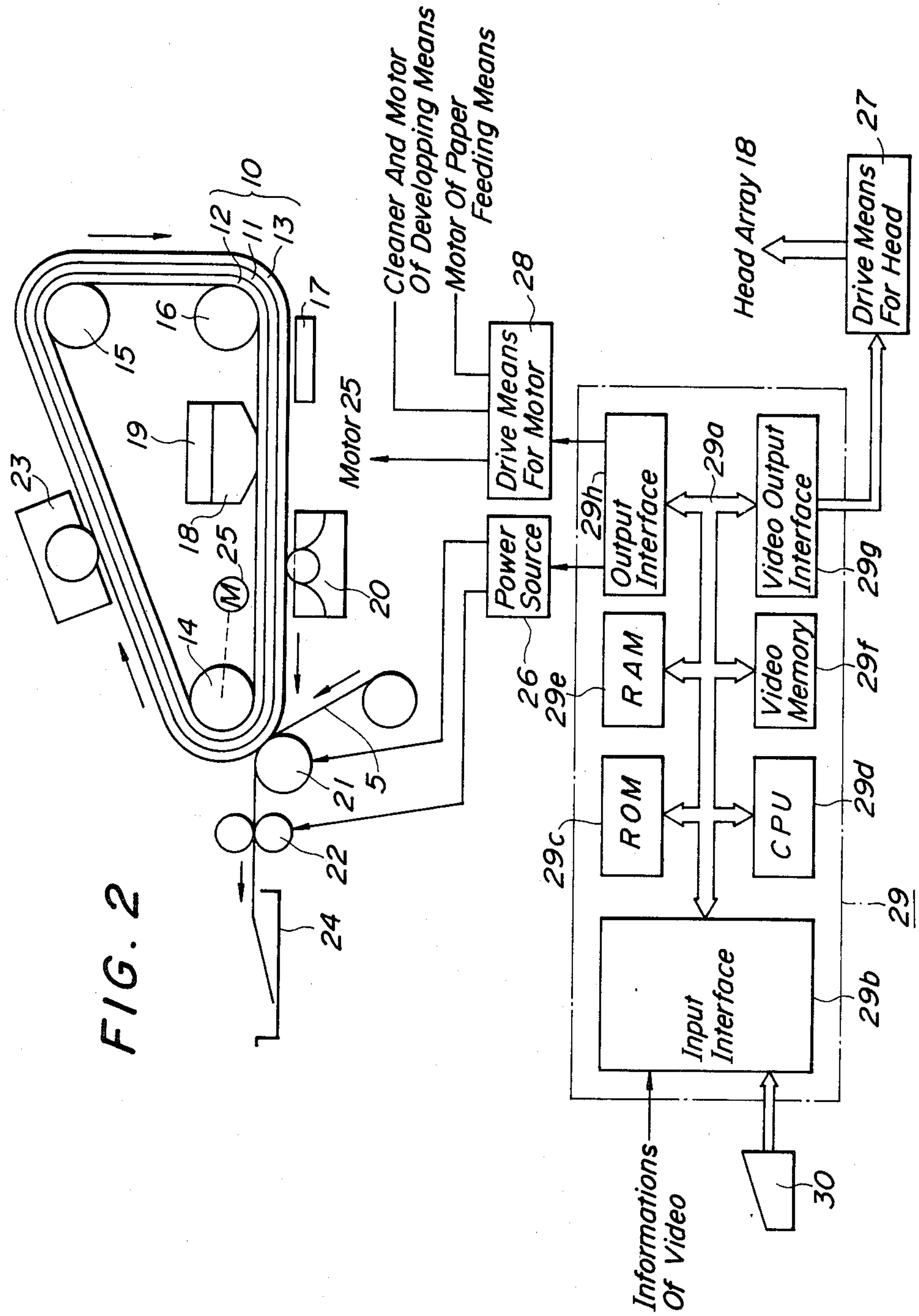
FIG. 2 is a schematic explanatory view illustrating a first embodiment of the present invention.

FIG. 2 illustrates the first embodiment of the magnetic recording apparatus according to the present invention. The magnetic recording apparatus comprises a magnetic recording medium 10 composed of an endless belt-like base layer 11 on one side of which a magnetic layer 12 of high permeability is disposed and on the other side of which a ferromagnetic layer 13 is placed, a driving roller 14, and driven rollers 15 and 16 provided at positions along the inner periphery of the recording medium 10 for circulating the recording medium 10 around them, a permanent magnet 17 mounted closely to the ferromagnetic layer 13 of the magnetic recording medium 10 for magnetizing the ferromagnetic layer 13 in a predetermined direction, a heating head array 18 (having the same general construction as that of the heating head array 3 in FIG. 1) abutted upon the magnetic layer 12 of high permeability with a prescribed distance to the permanent magnet 17 (in the transferring direction of the magnetic recording medium 10) for heating the high-permeability magnetic layer 12 in response to video information, a permanent magnet 19 mounted on the side opposite to the heating surface of the heating head array 18 to magnetize the high-permeability magnetic layer 12 in the direction opposite to the predetermined direction, a developing means 20 provided closely to the ferromagnetic layer 13 in succeeding course to the heating head array 18 for permitting magnetic toner to adhere to a latent magnetic image to form a visible image, a transferring means 21 opposed to the driving roller 14 through a recording paper 5 and the magnetic recording medium 10 to transfer the visible image on the ferromagnetic layer 13 to the recording paper (non-treated paper), a fixing means 22 for fixing the image on the surface of the recording paper 5 after completing the transfer thereof, a cleaner 23 for removing the remaining magnetic toner on the surface of the magnetic recording medium 10 after the transferring step, a tray 24 for receiving the recording paper after the fixation step, a motor 25 for driving the driving roller 14, a power source 26 for driving the fixing means 22 and the transferring means 21, a head driving means 27 for supplying a heating signal in response to video information for the heating head array 18, a motor driving means 28 for controlling motors of the respective driving systems, a controlling means 29 for controlling the power source 26, the head driving means 27, the motor driving means 28, etc. and a console 30 for outputting signals for command and the like to the controlling means 29.

As the base layer 11 of the magnetic recording medium 10, for example, Mylar or polyimide film having a thickness of 30 $\mu$m–100 $\mu$m may be used. One side of the film is uniformly coated with —$Fe_2O_3$ magnetic particles with 10 $\mu$m thickness to form the ferromagnetic layer 13, while the other side thereof is coated with Mn—Zn ferrite with 10 $\mu$m thickness to form the high-permeability magnetic layer 12 whereby an endless laminated belt is constructed with a size of 300 mm width and 800 mm length. The high-permeability magnetic layer 12 becomes paramagnetic at a Curie point of, for example, about 130° C. Thus, only the part heated in response to video signals converts into the paramagnetic state.

The permanent magnet 17 has magnetic field of about 400 Oe at its surface, while the permanent magnet 19 is mounted in such a fashion that the direction of its magnetic field is opposite to that of the permanent magnet 17 and has a magnetic field of about 500 Oe at its surface. The heating head array 18 has, for example, a line density of 16 dots/mm and a width of size A4.

As shown in the lower part of FIG. 2, the control means 29 comprises an input interface 29*b* for receiving video information and signals of the console 30 and for outputting the information and signals to a bus line 29*a* as digital signals, a ROM 29*c* which stores a program necessary for executing record processing and operation, a CPU 29*d* which executes the processing and operation in accordance with the program of the ROM 29*c* to output control commands and the like, a RAM 29*e* for temporarily storing data and processed results, a video memory 29*f* which stores video data at predetermined addresses, a video output interface 29*g* for outputting video data in every one line to the head driving means 27 at the time of recording, and an output interface 29*h* for transferring control command and the like outputting from the CPU 29 to the power source 26 and the motor driving means 28, respectively, in a prescribed format.

In the above construction, operation of the first embodiment of the invention will be described hereinbelow. The video information produced by means of a CCD or the like has been previously stored in the video memory 29*f*, while the magnetic recording medium 10 moves in a loop in a direction of the arrow in FIG. 2 driven by the motor 25. Further, a motor built in the cleaner 23 begins to drive to rotate a brush (not shown in detail).

Figure 3:
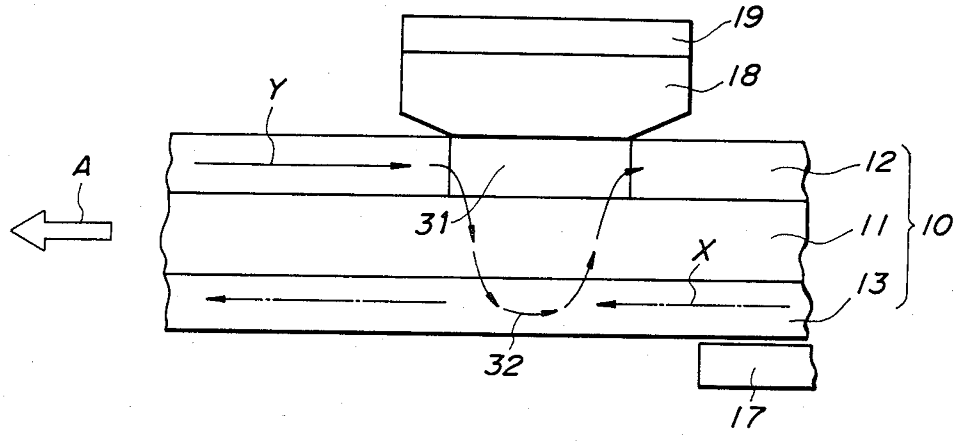
FIG. 3 is an explanatory view illustrating the principle for forming a latent magnetic image in accordance with the first embodiment of the present invention.

When a record starting button (not shown) is operated, video data are transferred from the video memory 29*f* to the head driving means 27 in every scanning line, and heating resistors in the heating head array 18 generate heat in accordance with the contents transferred so that the high permeable magnetic layer 12 of the magnetic recording means 10 is selectively heated. As illustrated in FIG. 3, when the magnetic recording medium 10 proceeds to the direction of arrow A, the high-permeability magnetic layer 12 is magnetized by the permanent magnet 19 along the Y direction as indicated by a solid arrow, while the ferromagnetic layer 13 is magnetized by the permanent magnet 17 along the X direction, as indicated by a dot-and-dash chain arrow. In this case, when the heating head array 18 is operated, only the part 31 of the high-permeability magnetic layer 12 immediately below the heating resistor in heat generating condition is converted to the paramagnetic state, so that magnetic flux flowing into the part 31 takes the long way around through the ferromagnetic layer 13 as represented by arrows as a magnetic path 32. Since the ferromagnetic layer 13 has a coercive force of 200–400 Oe, it is magnetized in response to video signals by means of the magnetic field due to the permanent magnet 19 in such a manner that the direction of the magnetization is opposite to that magnetized by means of the permanent magnet 17. Such magnetization is selectively made to form latent magnetic images successively. Because of the spacing existing in between the permanent magnet 19 and the ferromagnetic layer 13, the magnetic flux leaking from the part 31 of the high-permeability magnetic layer 12 immediately below the heating resistor attenuates to some extent before it reaches the ferromagnetic layer 13. For this reason, if the magnetic field of the permanent magnet 19 is made higher than that of the permanent magnet 17 by an amount compensating for such attenuation, a latent image can be formed appropriately.

Figure 4:
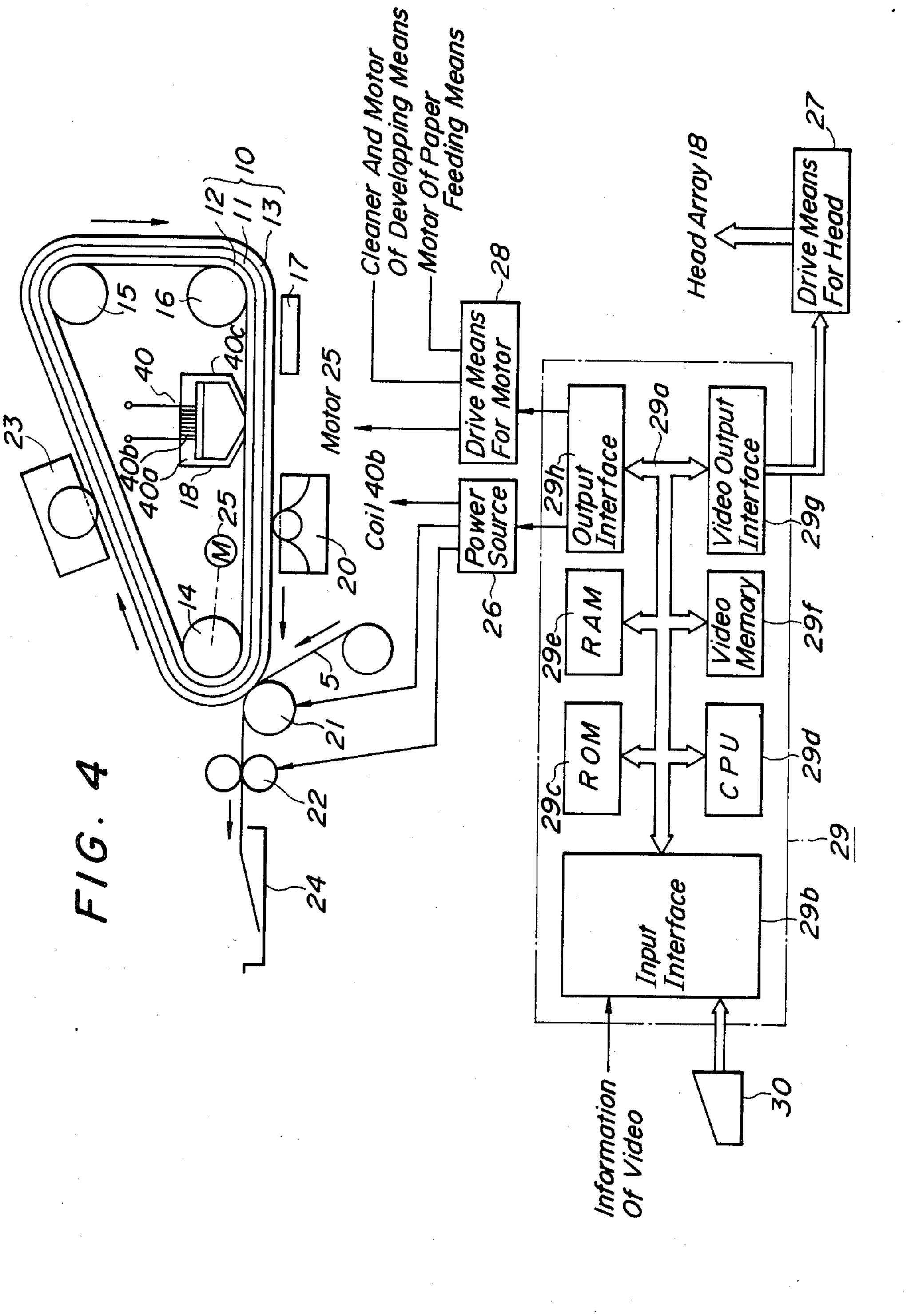
FIG. 4 is a schematic view illustrating the second embodiment of the present invention.

Next, FIG. 4 illustrates the second embodiment of the magnetic recording apparatus according to the present invention wherein the same reference characters as those of the first embodiment designate the same parts as those illustrated in FIG. 2, so that the description for the second embodiment overlapping that of the first embodiment is omitted. In the second embodiment, a heating head array 18 consists of a plurality of magnetic heads 40 each provided with a head portion 40*a*, a coil 40*b*, and a leg portion 40*c* at either side thereof, and a power source 26 drives the coil 40*b* (AC driving) in addition to a fixing means 22 and a transferring means 21. Furthermore, in the second embodiment, a permanent magnet 17 has a magnetic field of about 400 Oe at its surface, and a heating head array 18 has, for example, 16 dots/mm line density and size A4 width.

Figure 5:
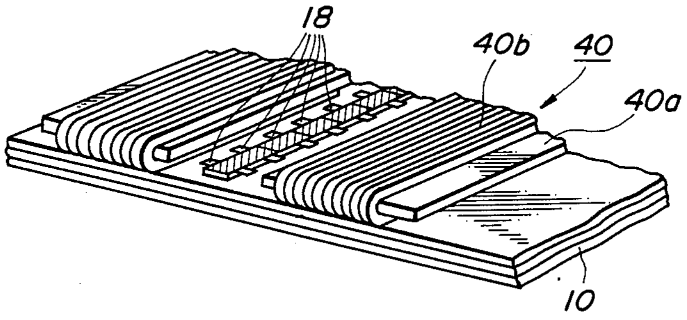
FIG. 5 is a perspective view showing an example of the magnetic head according to the second embodiment of the present invention.
Figure 6:
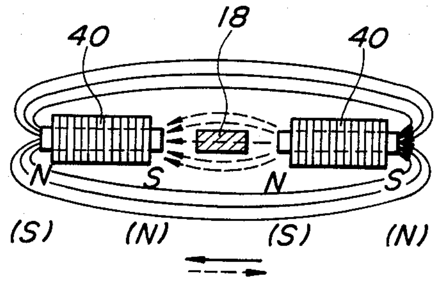
FIG. 6 is an explanatory view illustrating a state of generating alternating magnetic field of the magnetic head shown in FIG. 5.
Figure 7A:
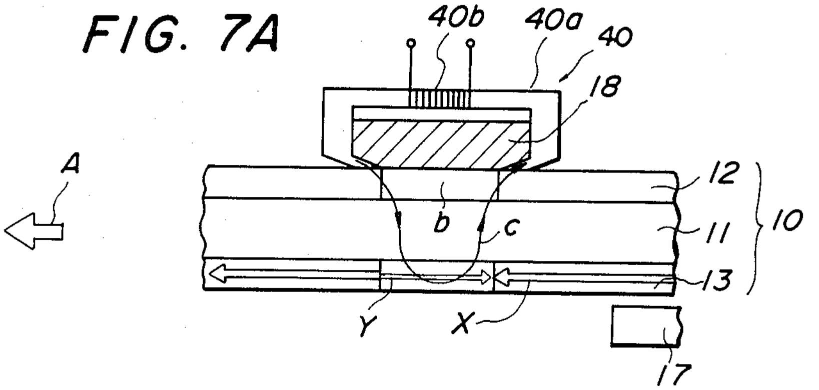
FIGS. 7A, 7B, and 7C are explanatory views each illustrating the principle for forming a latent magnetic image in accordance with the second embodiment of the present invention.
Figure 7B:
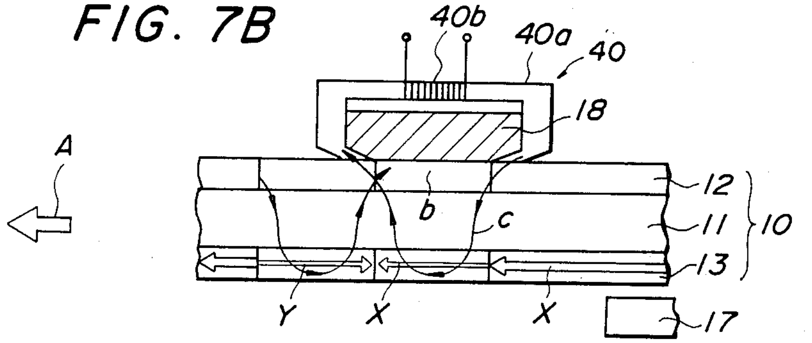
Figure 7C:
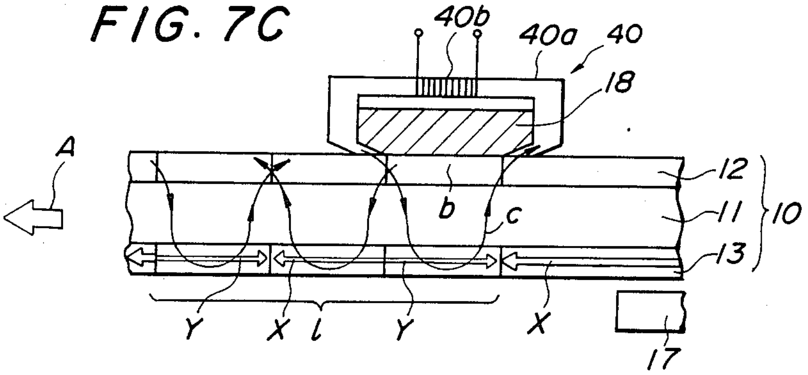

A specific example of the magnetic heads 40 is shown in FIG. 5 wherein each of them is fabricated by winding the coil 40*b* around the head portion 40*a* prepared by laminating silicon steel sheets or the like by a prescribed number of turns. These magnetic heads 40 thus obtained are located on opposite sides of the heating head array 18 in parallel to each other. Generation of magnetic flux in this case is as shown in FIG. 6 in which if N and S poles are formed in the first half cycle as illustrated therein, polarities in parentheses are formed in the following half cycle, so that the polarities change in every half cycle to generate an alternating magnetic field. Accordingly, the second embodiment of the magnetic recording apparatus is controlled such that odd numbers of magnetic fields are generated with one dot forming one picture element and wherein each of the magnetic fields is generated for each half cycle of alternating current. In this case, phases of the magnetic fields of the first and final half cycles in the odd numbers of half cycles are of the direction Y opposite to the magnetized direction X of a ferromagnetic layer 13. Thus, for instance, if a magnetic field of 3/2 cycle is intended to generate one dot as illustrated in FIG. 7A–7C, a traveling speed of a magnetic recording medium 10 may be preset so that the magnetic recording medium 10 travels by a length corresponding to one dot during a period of time required for outputting 3/2 cycle. For example, in the case where 3/2 cycle is intended to output for one dot in a density of 16 dots/mm for an alternating current of 600 Hz, a traveling speed of the magnetic recording medium 10 can be determined by the following expression:

$$\frac{1\ (\text{mm})}{16\ (\text{dots})} \times \frac{2}{3} \times 600\ (\text{sec}^{-1}) = 25\ \text{mm/sec} = 1\ \text{inch/sec}$$

In FIGS. 7A–7C, and FIG. 8 arrow A designates the direction of traveling of the magnetic recording medium 10.

Next, in operation of the second embodiment, the video data generated by means of a CCD or the like have been previously stored in a video memory 29*f*, while the magnetic recording means 10 moves in a circuit in a direction of the arrow in FIG. 4 (arrow A in FIGS. 7A–7C) by the driving of a motor 25. Further a motor built in the cleaner 23 begins to drive to rotate a brush (not shown in detail).

When a record starting button is operated, video information is transferred to a head driving means 27 in each scanning line, and heating resistors in the heating head array 18 generate heat in accordance with the contents transferred. Furthermore an alternating magnetic field is produced by the magnetic heads 40 to be applied to the high-permeability magnetic layer 12. Since such alternating magnetic field is sealed off from the ferromagnetic layer 13 by the high-permeability magnetic layer (when not heated), the magnetization of the ferromagnetic layer 13 is not interfered with.

As shown in FIGS. 7A-7C, the permanent magnet 17 magnetizes ferromagnetic layer 13 unidirectionally as indicated by arrow X, while the high-permeability magnetic layer 12 is alternatingly magnetized. In this situation, when the heating head array 18 is operated, only a part b of the high permeable magnetic layer 12 immediately below the heating resistors is converted to its paramagnetic state so that magnetic flux generated by the magnetic heads 40 takes the long way around through the ferromagnetic layer 13 as represented by a magnetic path c. Since the ferromagnetic layer 13 has a coercive force of only 200–400 Oe, it is magnetized in response to the video signal by the magnetic field generated by the magnetic heads 40. Such magnetization is selectively made in response to the video signal, and a latent magnetic image is selectively formed.

Figure 8:
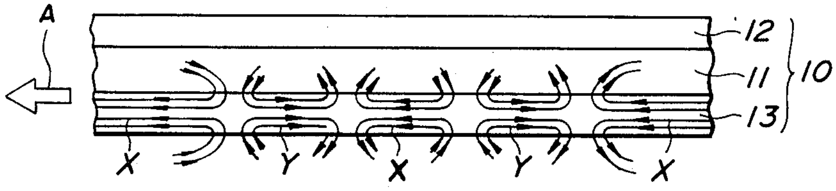
FIG. 8 is an explanatory view showing the direction in magnetization of each area of alternating magnetic flux as a single dot as well as a direction in magnetization of a ferromagnetic layer to the outside thereof.

The example illustrated in FIGS. 7A–7C is such that plural magnetic fields (three magnetic fields changing alternately their directions) are formed, with one dot forming one picture element by alternating current of 3/2 cycle. That is, the magnetic field of a single direction is avoided, unlike the case of FIG. 1B, even when a continuous picture part is formed as a wider black colored area on the ferromagnetic layer 13. As illustrated in FIG. 8, since magnetic flux flows alternatively in different directions in the respective dot units, there is no great difference in magnetic attraction force of the recording medium between the central portion and a peripheral portion in a comparatively wide latent magnetic image area as described above, and no white loophole is produced due to insufficient adhesion of toner.

A latent magnetic image thus generated is developed by a developing means 20, the resulting visible image is transferred to a recording paper 5 by means of a transferring means 21, and the transferred image is fixed onto the recording paper 5 by means of a fixing means 24. On the other hand, the surface of the magnetic recording medium 10 after the transferring step is cleaned by the cleaner 23. In the case where it is contemplated that a single latent image is to be developed repeatedly, this may be accomplished by retracting the heating head 18 and the permanent magnet 17 by a means not illustrated in the drawings, and repeating the processes of development, transferring and fixing.

When practicing the generation of a latent image based on the above construction and constants, favorable results of 1.2 or more optical density and 0.05 or less background concentration are obtained, and no deterioration in picture was observed even after 10,000 repetitions or more of the latent image generation.

In both of the embodiments, as the ferromagnetic layer 13, materials such as $CrO_2$, Co— —$Fe_2O_3$, Fe-Co and the like utilized for audio or video tape may also be employed other than the material as mentioned above, while as the high-permeability magnetic layer 12, a highly permeable magnetic material such as permalloy or the like may be utilized other than Mn-Zn ferrite. Furthermore the permanent magnet 17 (as well as the permanent magnet 19 in the first embodiment) may be replaced by an electromagnet or the like.

In addition, a laser beam, a flash lamp, or the like may also be utilized in place of the heating head array.

As described above, the first embodiment of the magnetic recording apparatus according to the present invention is constructed in such fashion that a ferromagnetic layer magnetized before forming a latent image is disposed on one side of a base layer and a magnetic layer of high permeability, which turns to paramagnetic by heating in response to video signals, is disposed on the other side of the base layer to obtain a laminated structure wherein a magnetic field of the opposite direction to the magnetic direction of the ferromagnetic layer is applied to the high-permeability magnetic layer, and magnetic flux is permitted to leak from the part turned paramagnetic by heating, whereby portions magnetized in the opposite direction to the original magnetized direction of the ferromagnetic layer are produced in the ferromagnetic layer. Therefore, according to the first embodiment of the magnetic recording apparatus, a printed image of high quality and high resolution can be obtained by apparatus of such simple construction as described above.

Furthermore, as described above, the second embodiment of the magnetic recording apparatus according to the present invention is constructed in such fashion that a magnetic recording medium has a laminated structure composed of a ferromagnetic layer magnetized before forming a latent image and a magnetic layer of high permeability heated in response to video data wherein an alternating magnetic field is applied to the high-permeability magnetic layer to leak alternating magnetic flux from the part which has been converted to paramagnetic by heating, thereby to form a latent magnetic image in the ferromagnetic layer. Therefore, in accordance with the second embodiment of the magnetic recording apparatus, a recorded picture of high quality and high resolution can be attained by apparatus of such simple construction as described above. More particularly, since a latent image is generated by aternating magnetization in the second embodiment, reproducibility is excellent for images where there is a wider black colored part, and the "white loophole" at the central portion in the wider black colored part can be prevented, so that a clear picture can be obtained.

Furthermore, in both the above embodiments, since the heating head array is located opposite to the developing means through the recording medium, there is no adhesion of the magnetic toner to the heating head array 18, so that there is the definite advantage that the maintance work including cleaning of the head array 18 becomes unnecessary.

Although the present invention has been described with reference to certain preferred embodiments thereof, it is clear that many modifications and alterations may be made by those skilled in the art without departure from the spirit and scope of the present invention.

What is claimed is:

1. Magnetic recording arrangement for a thermomagnetographic device comprising:

a magnetic recording medium composed of a base layer, a first, ferromagnetic layer coated on a first side of the base layer, and a second, high-permeability magnetic layer coated on a second side of said base layer;

first magnetizing means for uniformly magnetizing said ferromagnetic layer in one predetermined direction to condition said first layer for forming a magnetic image thereon;

heating means positioned on the second side of said magentic recording medium for selectively heating said second, high-permeability magnetic layer in response to a video signal applied thereto to heat selected portions of said second layer sufficiently to convert such portions to a paramagnetic state;

second magentizing means applying to said second magnetic layer a magnetic flux of a direction opposite to said one predetermined direction and forming a latent magnetic image on said first layer by reason of magnetic flux leakage from the heated paramagnetic portions of said second layer; and developing means positioned on the first side of said magnetic recording medium for permitting a magnetic toner to adhere to the latent magnetic image;

whereby said developing means and said heating means are located on opposite sides of said magnetic recording medium.

2. Magnetic recording arrangement as claimed in claim 1, wherein said first magnetizing means is disposed on said one side of said magnetic recording medium and said second magnetizing means is disposed on said other side thereof.

3. Magnetic recording arrangement as claimed in claim 1, wherein said second magnetizing means produces a stronger magnetic field than that of said first magnetizing means.

4. Magnetic recording arrangement as claimed in claim 1, wherein said recording medium is in the form of an endless belt; and further comprising drive means for driving said recording medium past said first magnetizing means and then past said heating means and said second magnetizing means.

5. Magnetic recording arrangement as claimed in claim 4, wherein said base layer is a polymer film.

6. Magnetic recording arrangement as claimed in claim 5, wherein said base layer film is polyimide.

7. Magnetic recording arrangement as claimed in claim 4, wherein said ferromagnetic layer is formed of a material selected from a group consisting of —$Fe_2O_3$, $CrO_2$, CO— —$Fe_2O_3$, Fe-Co, and combinations thereof.

8. Magnetic recording arrangement as claimed in claim 4, wherein said first, ferromagnetic layer has a coercive force of 200–400 Oe.

9. Magnetic recording arrangement as claimed in claim 4, wherein said second, high-permeability layer has a Curie point on the order of 130° C.

10. Magnetic recording arrangement as claimed in claim 9, wherein said second, high-permeability layer is composed of Mn-Zn ferrite.

11. Magnetic recording arrangement comprising a magnetic recording medium composed of a base layer, a first, ferromagnetic layer coated on a first side of the base layer, and a second, high-permeability magnetic layer coated on a second side of said base layer; a first magnet for uniformly magentizing said first ferromagnetic layer in a predetermined direction to condition the first layer for forming a latent magnetic image thereon; heating means positioned on said second side of said magnetic recording medium for heating said second layer in response to video signals to convert selected portions by heat into a paramagnetic state; means for generating an alternating magnetic field, applying said alternating magnetic field to said second layer, and forming a latent magnetic image on said first, ferromagnetic layer by alternating magnetic flux leakage from the heated paramagentic portions of said second layer; and developing means positioned on said first side of said magnetic recording medium for permitting a magnetic toner to adhere to the latent magnetic image; whereby said developing means and said heating means are located on opposite sides of said magnetic recording medium.

12. Magnetic recording arrangement as claimed in claim 11, wherein said alternating magnetic field, corresponding to one picture element of the latent magnetic image, generated by an alternating current applied by an alternating current source to said means for generating an alternative magetic field, is composed of $2n+1$ cycles, where n is an integer, of magnetic flux, the cycles having alternating directions of magnetic flux, and with the magnetic flux for each one dot of the picture element being generated by a half-cycle of the alternating current, and the direction of magnetization of the ends of each one picutre element being both opposite to the predetermined direction of uniform magnetization of the first, ferromagnetic layer.

* * * * *